(12) United States Patent
Schmitz et al.

(10) Patent No.: US 8,627,569 B2
(45) Date of Patent: Jan. 14, 2014

(54) RADIAL JOINT AND PROCESS FOR MANUFACTURING SUCH A RADIAL JOINT FOR A MOTOR VEHICLE

(75) Inventors: Jürgen Schmitz, Diepholz (DE); Christian Rziczny, Neuenkirchen-Vörden (DE); Horst Pott, Espelkamp (DE); Benjamin Ziebart, Wallenhorst (DE); Michael Heuer gen. Hallmann, Ostercappeln (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/407,332

(22) Filed: Feb. 28, 2012

(65) Prior Publication Data

US 2012/0210582 A1    Aug. 23, 2012

Related U.S. Application Data

(62) Division of application No. 12/295,877, filed as application No. PCT/DE2007/000443 on Mar. 12, 2007, now abandoned.

(30) Foreign Application Priority Data

Apr. 4, 2006   (DE) .................. 10 2006 016 060

(51) Int. Cl.
*F16C 43/06*   (2006.01)
*F16C 11/06*   (2006.01)

(52) U.S. Cl.
USPC ............. 29/898.046; 29/898.043; 403/135; 403/140

(58) Field of Classification Search
USPC .............. 29/898.043, 898.044, 898.045, 29/898.046; 403/135, 130, 140
See application file for complete search history.

(56) References Cited

U.S. PATENT DOCUMENTS 3,389,927 A * 6/1968 Herbenar ............ 403/140
4,597,150 A * 7/1986 Fister et al. ........ 29/407.02

(Continued)

FOREIGN PATENT DOCUMENTS

DE            3419871 A * 11/1985
JP      Sho-61-147929       7/1986

(Continued)

OTHER PUBLICATIONS

English Translation of JP 10-244818 obtained from JPO website Mar. 20, 2013.*

Primary Examiner — David Bryant
Assistant Examiner — Jason L Vaughan
(74) Attorney, Agent, or Firm — McGlew and Tuttle, P.C.

(57) ABSTRACT

A radial joint with a metallic housing (1), through the opening (2) on one side of which a ball pivot (3) can be inserted into an interior space (4) of the housing (1). The housing (1) has, in the area of its opening (2), a section (7), which is prepared by machining and which is deformed by a cold forming process. A process for manufacturing a radial joint includes: manufacturing the housing blank, machining of section (7) close to the opening (2) of housing (1), inserting the joint ball (5) of ball pivot (3) into the interior space (4) of housing (1), cold forming of the opening-side edge section of housing (1) until a metallic overlap (13) is attained between the joint ball (5) and housing (1).

18 Claims, 4 Drawing Sheets

(56) References Cited

U.S. PATENT DOCUMENTS

| | | | |
|---|---|---|---|
| 4,681,475 A * | 7/1987 | Kanegawa | 403/40 |
| 5,509,748 A * | 4/1996 | Idosako et al. | 403/133 |
| 6,010,271 A * | 1/2000 | Jackson et al. | 403/131 |
| 6,213,675 B1 * | 4/2001 | Ungruh et al. | 403/135 |
| 6,325,567 B1 * | 12/2001 | Kato et al. | 403/270 |
| 7,040,812 B2 * | 5/2006 | Boshier et al. | 384/192 |
| 7,040,833 B2 * | 5/2006 | Kondoh | 403/140 |
| 7,260,878 B2 * | 8/2007 | Kondoh | 29/441.1 |
| 7,644,500 B2 * | 1/2010 | Schmidt et al. | 29/898.044 |
| 8,047,739 B2 * | 11/2011 | Sellers et al. | 403/135 |

FOREIGN PATENT DOCUMENTS

| | | |
|---|---|---|
| JP | Hei-08-061356 | 3/1996 |
| JP | 10-244818 | 9/1998 |
| JP | 2000-035031 | 2/2000 |
| JP | 2003-148448 | 5/2003 |

\* cited by examiner

RADIAL JOINT AND PROCESS FOR MANUFACTURING SUCH A RADIAL JOINT FOR A MOTOR VEHICLE

CROSS REFERENCE TO RELATED APPLICATIONS

This application is a divisional under 37 CFR 1.53(b) of pending prior application Ser. No. 12/295,877 filed Oct. 3, 2008 now abandoned and claims the benefit (35 U.S.C. §120 and 365(c)) of International Application PCT/DE 2007/000443, Mar. 12, 2007 which designated inter alia the United States and which claims the benefit of priority of German Patent Application DE 10 2006 016 060.6 filed Apr. 4, 2006. The entire contents of each application is hereby incorporated by reference in its entirety.

FIELD OF THE INVENTION

The present invention pertains to a radial joint for a motor vehicle as well as to a process for manufacturing such a radial joint.

BACKGROUND OF THE INVENTION

A distinction is made among ball and socket joints between axial joints and radial joints. This distinction depends on the particular direction of action of the forces acting on the ball pivot. The position of the non-deflected ball pivot is used as a reference for this definition of the different ball and socket joints. Accordingly, the principal load on an axial joint is in the direction of the central longitudinal axis of the ball pivot, whereas the principal load in a radial joint acts at right angles to the central longitudinal axis of the ball pivot. Thus, these types of joints differ fundamentally from one another regarding the loads acting on them and hence also regarding the design. In particular, the design of the housing and the material that can be used for the housing are different.

Thus, one peculiarity of axial joints is that the ball pivot with its joint ball is mounted in the housing such that it cannot be separated from the housing during loading along its central longitudinal axis, i.e., in the axial direction. This so-called extraction force of the axial joint is a decisive variable and an essential quality criterion of an axial joint.

In radial joints, the ball pivot is loaded by forces that act on same radially in relation to its central longitudinal axis. As a consequence of this, the extraction force of the ball pivot is lower than in axial joints, which has a decisive effect on the design of the housing.

Regardless of the type of construction of the ball and socket joint in question, considerable efforts are made to make it possible to manufacture these joints at a low cost. Complicated machining operations are to be avoided on the joint to be manufactured as much as possible.

An axial joint as well as a process for mounting such an axial joint are described for this reason in DE 197 55 020 A1. The axial joint comprises a one-piece metallic housing, which is open on one side and through the opening of which a ball pivot can be inserted into an interior space of the housing, the joint ball of the ball pivot being mounted pivotably and rotatably in a bearing area of the interior space. A pivot section of the ball pivot, which section is connected to the joint ball, protrudes from the housing through the opening of the housing. The ball pivot is fixed within the housing by cold forming the edge area of the opening of the housing in the ball pivot. A bearing shell, which is preferably manufactured from a plastic-metal composite, is arranged between the joint ball of the ball pivot and the interior space of the housing. The bearing shell, which has a regular cylindrical opening cross section for inserting the joint ball before the deformation of the edge area, is also deformed by the deformation of the edge area of the opening of the housing such that this opening-side edge area of the bearing shell comes into contact with the joint ball. As a consequence of the simple design of the housing, it is possible to manufacture the housing for this axial joint as a whole by a cold forming process. This axial joint can be produced very cost-effectively as a result.

Moreover, a radial joint, which is manufactured as a whole by a cold forming process, is known from DE 195 36 035 A1. However, this radial joint has a housing that is open on both sides, so that machining of the contact area of the cover is necessary. In addition, the radial joint has a straight shaft of a very simple shape. However, if, for example, the housing has a shaft with a bend or if other geometric shapes of the housing are necessary, the cold forming process will soon reach its limits. Moreover, the cold forming process requires a relatively soft material, and, for example, a steel material of low strength, such as C45, is therefore used in order to manufacture a housing out of it. This low strength of the housing material must be compensated by design measures. However, this means an increased use of material and consequently also increased weight of such joints.

A cold forming process cannot be used for radial joints if these have a highly complicated housing geometry and, because of the installation conditions in the motor vehicle, a shaft with great radii of curvature. For this reason, such radial joints have hitherto been manufactured by means of a hot forming process and are subsequently to be processed by machining at a great effort in order to produce, for example, the interior space for inserting the ball pivot and to prepare the connection area for fastening the cover, which is needed to close the housing, or to prepare a groove for accommodating a sealing bellows edge at the joint housing. Considerable costs arise, which make the manufacturing process needlessly expensive, due to the fact that a plurality of machining operations and, moreover, a plurality of chucking operations in the machining unit are necessary for finishing a housing blank prepared by a hot forming process for a radial joint. This essential drawback for the hot forming process was already described in DE 195 36 035 A1. Steels such as 30MnSiV6, which have a substantially higher strength (approx. 950 N/mm2) compared to the material C45 mentioned before, can be considered for use as materials for radial joint housings that are manufactured by means of a hot forming process.

Since radial joints used hitherto, such as those disclosed in DE 195 36 035 A1 as well, usually have a housing that is open on both sides, the side of the housing located opposite the opening must be subsequently closed with a cover. For example, mechanical damage to the cover area during the use of such a radial joint may cause corrosive media, such as brines, to produce rusting in the area of the cover during operation of the motor vehicle in the winter. However, this may cause leakage and hence failure of the radial joint. Therefore, even though housings open on both sides have hitherto been necessary in radial joints, they do have drawbacks. This is compounded by the circumstance that the machining of the cover support surface and the machining of the opening arranged opposite for inserting the ball pivot as well as of the area in which the edge of the sealing bellows is to come into contact with the housing require a plurality of consecutive chucking operations for machining the radial joint housing. This time-consuming rechucking of the workpiece is likewise associated with corresponding manufacturing costs, which are not desirable.

SUMMARY OF THE INVENTION

The basic object of the present invention is to provide a radial joint as well as a process for manufacturing such a radial joint, which has a simple design and therefore can be manufactured at a low cost.

A radial joint for a motor vehicle with a one-piece metallic housing, through the opening on one side of which a ball pivot can be inserted into an interior space of the housing, wherein the joint ball of the ball pivot is mounted pivotably and rotatably in a bearing area of the interior space and a pivot section of the ball pivot, which said pivot section is connected to the joint ball, protrudes from the housing through the opening of the housing, is perfected according to the present invention such that in the area of its opening, the housing has a section, which is prepared by machining and which can be deformed by a cold forming process.

An essential aspect of the present invention is that the housing has only one section in the area of the opening of the housing whose cross section is changed once by machining such that a subsequent cold forming operation can be carried out on this section to finish the housing.

The radial joint can thus be manufactured in a very simple manner and at a very low cost. The machining of the outer section of the joint housing in a radial joint according to the present invention likewise makes it possible to arrange the edge area of a sealing bellows sealing the radial joint without an additional operation being necessary for this. The processing of the radial joint housing according to the present invention as a whole can thus be carried out by only one machining operation. A complicated and expensive rechucking of the workpiece is no longer necessary. The cover, which was previously necessary, can be eliminated, as a result of which it was possible to eliminate the need for at least one additional component.

The radial joints according to the present invention are suitable for use in the area of the wheel suspension of motor vehicles. However, use as a radial joint for a track rod is preferred.

Furthermore, a radial joint, which has a simple design and can therefore be manufactured and mounted at a low cost, is made available with a first variant of the present invention. One essential advantage of this radial joint is that the housing as a whole can be manufactured by a hot forming process. Thus, not even complicated housing geometries are a problem any longer.

In addition, another advantage of the present invention is that as a consequence of the hot forming process, the housing has a high strength, which results from the material used, which has a higher strength, on the one hand, and from the process itself, on the other hand, because the structure of the steel undergoes changes during the processing of the material. This is turn causes that the housing can be designed, for example, with smaller cross sections compared to radial joints known hitherto.

Due to the higher strength of the material of the housing of the radial joint, comparably strong extraction forces can be attained for the ball pivot with a substantially smaller metallic overlap than in joint designs according to the state of the art. The metallic overlap between the external diameter of the joint ball and the internal diameter of the opening of the housing is an indicator of the extraction force that can be attained for the ball pivot.

Corresponding to one embodiment of the present invention, the hot forming process may be a forging process. Radial joint housings of any cross section and any design can be manufactured by this forging process, i.e., even complicated geometries can be obtained thereby.

To close the housing, the section in the edge area of the opening of the housing, whose cross section was reduced once by a machining operation, is deformed by cold forming. The section has a regular cylindrical cross section prior to its deformation.

Following the deformation, an opening is left in the housing, through which the ball pivot protrudes from the housing. This opening has a circular ring-shaped cross section. Maximum deflection angles can thus be attained with such a radial joint in each direction of deflection of the ball pivot, i.e., the ball pivot can be pivoted about the center of the joint ball as desired. Consequently, the pivoting range of the ball pivot is maximized in a radial joint according to the present invention.

In addition, the shape of the opening after the deformation may also have an oval geometry, so that different deflection angles can be obtained in different directions of angling of the ball pivot. The oval geometry can be obtained, for example, by providing material accumulations, which will make possible a non-round cross section of the opening already on the housing blank in the area of the housing opening after the deformation.

To guarantee a sufficient extraction force, i.e., a sufficient securing of the ball pivot within the deformed housing, the diameter of the joint ball is larger after the mounting of the joint than the diameter of the remaining opening of the housing. The metallic overlap between the external diameter of the joint ball and the internal diameter of the opening of the housing is an indicator of the extraction force of the ball pivot that can be attained.

In addition, it is highly advantageous if a radial joint according to the present invention has a bearing shell, which accommodates the joint ball and in which said joint ball is mounted movably, in the interior space of the housing. The properties of the radial joint can be decisively affected by means of such a bearing shell. For example, vibration damping can be achieved with it. Corresponding to one embodiment of the present invention, the bearing shell may consist of various materials. The selection of the suitable material depends on the intended property of the mounting of the ball pivot. For example, the bearing shell may consist of a plastic, a plastic composite, a multicomponent material or at least partly also of a plastic-metal composite.

Depending on the geometry of the joint and the parameters to be obtained, it is, moreover, meaningful if the bearing shell has a support flange, which is supported on a flange, which is present in the interior space of the housing and corresponds to the support flange. The bearing forces acting via the housing or the pivot can thus be optimally supported. The properties of the radial joint according to the present invention can thus be optimized.

As was stated above, a housing according to the present invention, which was manufactured by a hot forming process for a radial joint, may also have complicated geometries. A shaft is often made integrally in one piece with such a housing. This shaft may also have, according to one embodiment of the present invention, a bend or a plurality of bends. A bend is defined as a shape deviating from the straight central longitudinal axis of the shaft. It is, moreover, also significant for the manufacturing technology if the housing and the shaft are manufactured together by means of a hot forming process, for example, a forging process. The manufacturing costs for a housing of a radial joint according to the present invention thus decrease considerably.

However, it may also be meaningful, for creating, for example, a modular system, to manufacture the shaft and the housing separately. These will then be attached to one another, for example, by means of a connection in substance. A system of uniform, standardized components, which can be combined with one another according to the requirements imposed on the radial joint, can thus be created. The manufacturing costs can be reduced substantially by such a measure as well.

Corresponding to one embodiment of the present invention, a cold extrusion process is preferably used for the cold forming process. Corresponding production plants are available for this.

The process according to the present invention for manufacturing a radial joint of the above-described design has the following process steps:

Manufacture of the housing blank, machining of the section close to the opening of the housing, insertion of the joint ball of the ball pivot into the interior space of the housing, and cold forming of the opening-side section of the housing until a metallic overlap, which guarantees a sufficient extraction strength for the joint to be produced and a positive-locking connection is ensured between the components contacting one another, develops between the joint ball and the housing.

The radial joint can be manufactured in only a few process steps by means of the process described for manufacturing a radial joint. It is essential now that a controlled metallic overlap can be prepared to achieve a predefined extraction strength and reliable positive-locking connection of the components contacting each other can be achieved. The quality of the radial joint manufactured by means of such a process is decisively improved compared to prior-art embodiments known from the state of the art. The cost reductions already mentioned are considerable.

To achieve the metallic overlap indicated, the diameter of the joint ball after mounting the joint should be larger than the remaining opening of the housing. This quality criterion, which can be checked in a simple manner, can be measured during the production process. The deformation of the housing is carried out with periodic or permanent force and/or pressure measurement during the manufacture of the radial joint according to the present invention. The parameters of the radial joint according to the present invention can be set exactly and guaranteed permanently by this periodic or permanent force and/or pressure measurement. Low moments of friction are thus obtained between the components movable relative to one another.

This can also be achieved by another embodiment of the process described, according to which embodiment the housing is closed during periodic or permanent measurement of the torque necessary for deflecting and/or rotating the ball pivot. The friction values of the radial joint after its completion are thus set optimally, so that the necessary quality criteria can be met with such a process for a radial joint and can also be demonstrated in case of doubt. This possibility of demonstration is an increasing requirement of the users of such radial joints. The radial joints of the design in question here are safety components in a motor vehicle, and the above-described quality control is therefore of crucial significance. Therefore, it is also not irrelevant that the radial joint according to the aforementioned process steps can be closed in a controllable manner.

Corresponding to a variant of the described process according to the present invention, the joint ball can be inserted together with the bearing shell accommodating same into the interior space of the housing. The deformation of the opening-side section of the housing is associated in this case with the deformation of the opening-side section of the bearing shell. The opening-side area of the bearing shell has a predominantly regular cylindrical geometry before its deformation. It can thus be achieved that the bearing shell is optimally in contact with the surface of the joint ball before the housing is closed. If this procedure is combined with the above-mentioned measuring method, a radial joint manufactured in this manner is optimized in respect to both its tolerances and the mobility of the components and meets the highest comfort requirements, even though it was manufactured by a simple manufacture at a low cost.

The various features of novelty which characterize the invention are pointed out with particularity in the claims annexed to and forming a part of this disclosure. The present invention will be explained in more detail below on the basis of the drawings attached. The exemplary embodiment shown does not, however, represent any limitation to the variant shown, but is used only to explain a principle of the present invention. Identical or very similar components are designated by the same reference numbers. To illustrate the mode of action according to the present invention, only highly simplified schematic views are, moreover, shown in the figures, in which the components not essential to the present invention are not shown. However, this does not mean that such components are not present in a solution according to the present invention. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
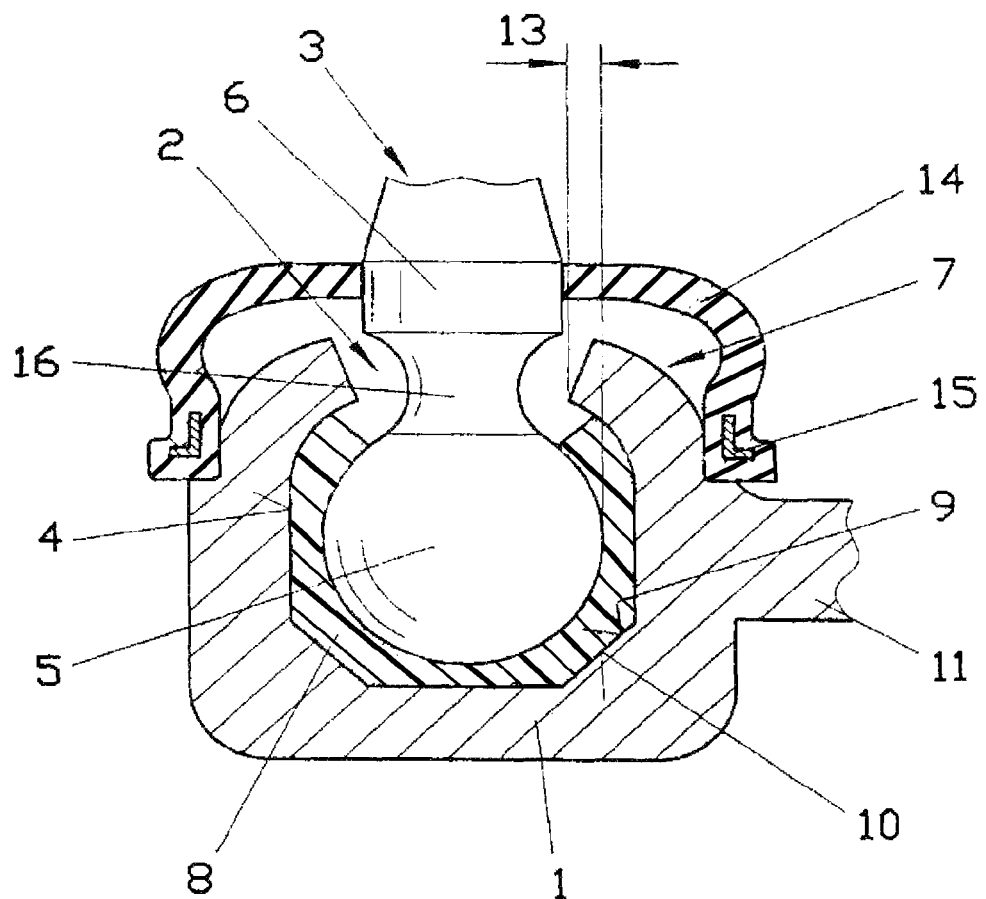
FIG. 1 is a detail of the cross section of a radial joint according to the present invention.

Referring to the drawings in particular, the view of a partial cross section of a radial joint according to the present invention shown in FIG. 1 has a housing 1, which was manufactured in this case as a whole, i.e., together with the shaft 11, by means of a hot forming process. The housing was manufactured by a forging process in this case. The pot-shaped housing is provided with an opening 2 on one side. On the side located opposite the opening 2, the housing is closed. Since no opening is provided in this area, it is unnecessary to insert a cover, which would have to be manufactured and mounted in a complicated manner, on the side located opposite the opening 2. A ball pivot 3 is inserted into the interior space 4 of the housing through the opening 2 of housing 1. A bearing shell 8 made of plastic is present between the wall of the interior space 4 and the joint ball 5. This bearing shell 8, provided with absorbing properties, surrounds the joint ball 5 of the ball pivot 3 nearly completely. In the area of opening 2 of the housing 1, it likewise has an opening, through which the pivot 6 of the ball pivot 3 protrudes. The opening 2 of the housing 1 determines, moreover, the pivoting range of the ball pivot 3, i.e., the extent of the possible deflection of the ball pivot 3 about the center of the joint ball 5. A section 7, which is present on the housing 1 on the outside, was brought in advance to the necessary dimension by means of machining for preparation for carrying out the cold forming process. This section 7 of the housing 1, which was regular cylindrical before the deformation, is deformed in the direction of the ball pivot 3 in the course of the process in which the housing is produced. The deformation is carried out by means of a cold forming process. A sealing bellows 14, in the housing-side edge area of which a straining ring 15 is inserted by vulcanization, is arranged on the outside of the housing in the area of section 7. The sealing bellows 14, manufactured from an elastomeric material, preferably rubber, is directly sealingly in contact with the ball pivot 3 with its other end located opposite the straining ring 15 in the area of pivot 6.

The ball pivot 3 has, furthermore, a pivot neck 16, which is formed approximately in the area of opening 2 of the housing. In the lower area located opposite the opening 2 of housing 1, the housing has a flange 10, which has a slope in relation to the central longitudinal axis of the non-deflected ball pivot 3. A support flange 9 of the bearing shell 8 is supported on this flange 10 of housing 1.

Figure 2:
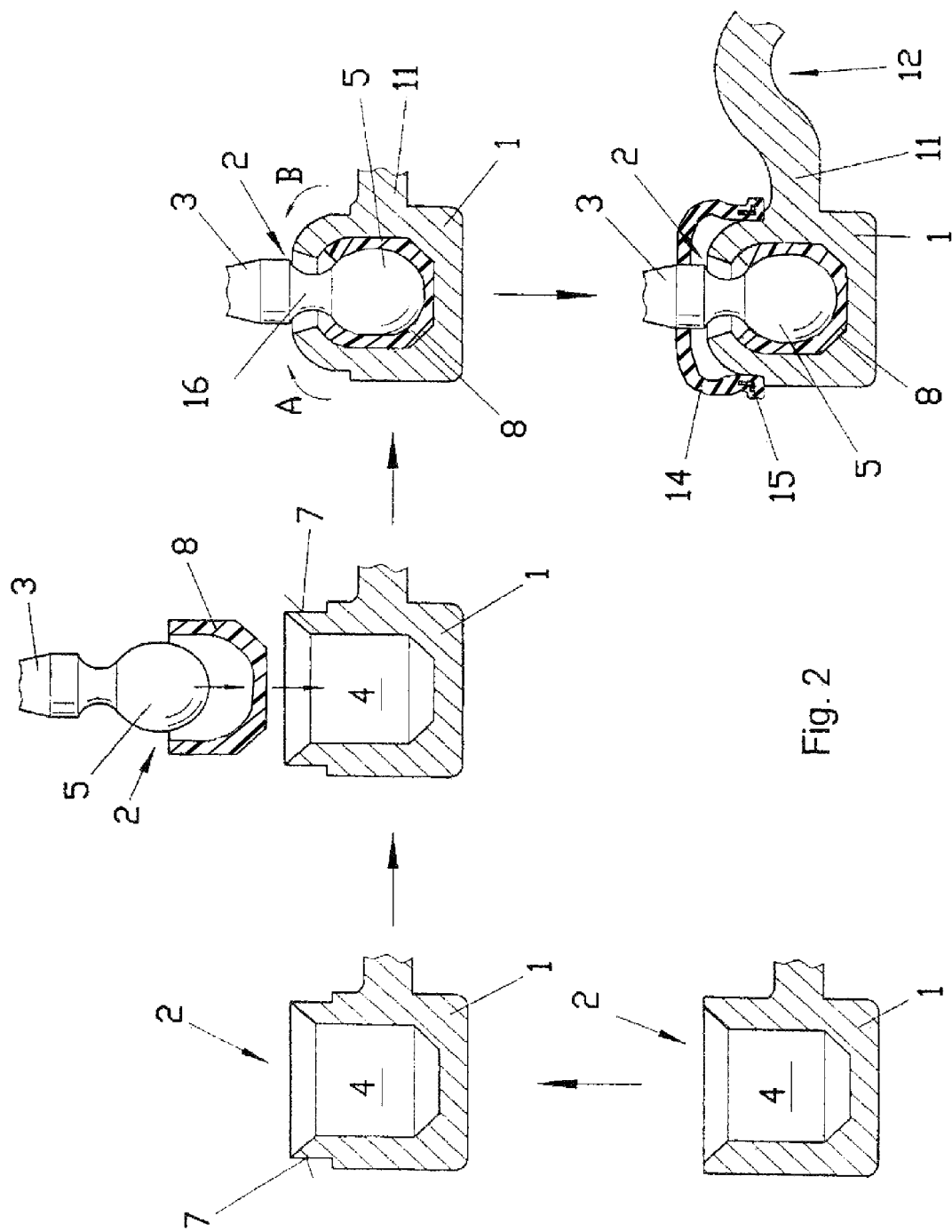
FIG. 2 is a simplified flow chart for manufacturing a radial joint according to the present invention.

FIG. 2 shows a flow chart, which shall illustrate the manufacturing process for producing a radial joint according to the present invention in a simplified manner. A housing blank 1 is first manufactured by means of a forging process. This housing blank 1 has an interior space 4 and an opening 2 and has overmeasures due to tolerances compared to the finished housing.

In the next step, a section 7 is prepared at the opening-side section of housing 1 by a single machining operation. It is possible to also carry out a surface machining of the interior space 4 of the housing 1 with this machining operation, but this operation is not absolutely necessary.

The next process step consists of attaching the bearing shell 8, which has a regular cylindrical geometry at first on the opening side, on the joint ball 5 of the ball pivot 3. The assembly unit thus obtained, comprising the ball pivot 3 and the bearing shell 8, is inserted into the interior space 4 through opening 2 of the housing 1.

The deformation of the edge area 7 of the housing 1 by a cold forming process is carried out in the next step. Section 7 of housing 1 is now moved in the direction of arrows A and B shown in FIG. 2 towards the ball pivot 3. At the same time, deformation of the corresponding, opening-side section of the bearing shell 8 is carried out during this cold forming process, so that this [bearing shell] will come into contact with the joint ball 5. This housing closing operation is supported by a measurement of the forces applied to section 7 of housing 1, which takes place during the deformation. Furthermore, the torque needed to deflect the ball pivot 3 about the center of the joint ball 5 is periodically determined. The specified parameters of the joint can thus be adapted very accurately to the requirements imposed on the joint during the closing of the housing.

In a final operation, opening 2 of housing 1 is closed by a sealing bellows 14, which has a vulcanized straining ring 15 in this case only on one side in the area of section 7 of housing 1. The straining ring 15 brings about the pressing of the sealing bellows 14 onto the housing 1, so that optimized sealing is ensured here. The opposite end of the sealing bellows 14 is sealingly in contact with the ball pivot 3. As can be recognized from the view in FIG. 2, shaft 11 of the housing 1 has a bend 12. This bend is prepared together with the housing blank by the hot forming process (forging process).

Figure 3:
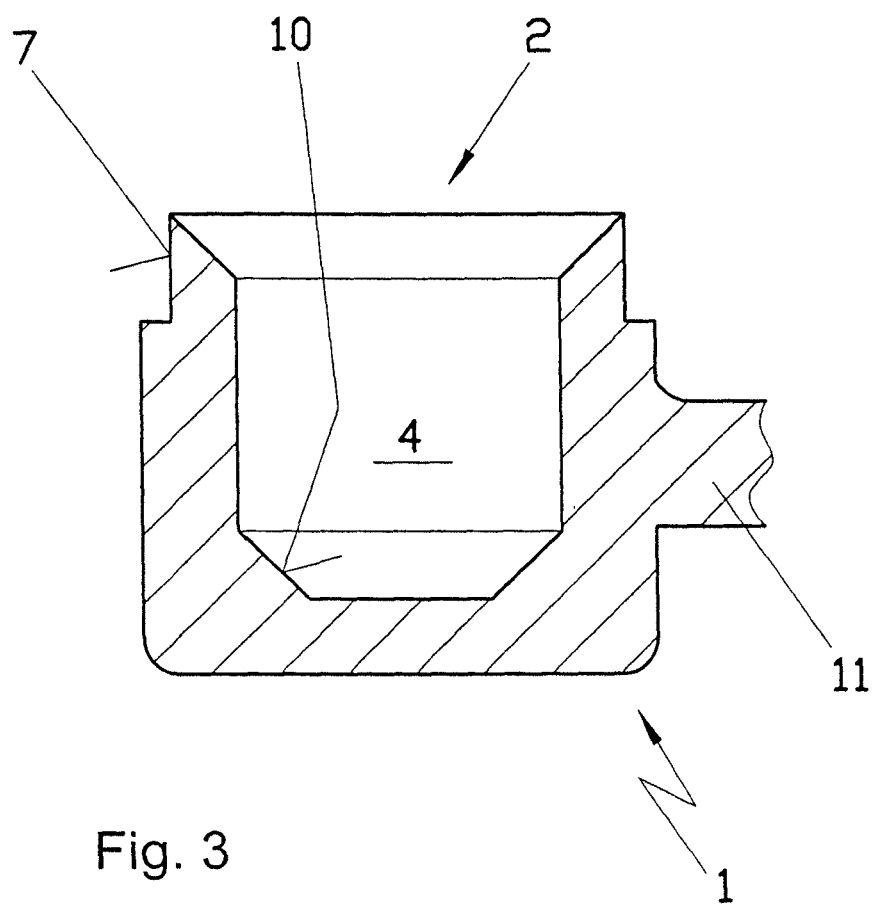
FIG. 3 is a cross sectional view of a first embodiment variant of a housing for a radial joint according to the present invention.

FIG. 3 shows a first embodiment variant for a housing 1 of a radial joint according to the present invention in a cross section. Shaft 11, which is made in one piece with housing 1, the interior space 4 present within the pot-shaped housing 1 for subsequently accommodating the bearing shell 8 with the ball pivot 3, as well as the opening 2 of housing 1 provided for this can be recognized here. On the opening-side outer surface of housing 1, the housing has a section 7 prepared by machining, which is suitable for being deformed by cold forming as a consequence of the machining in order to make thus possible the above-described closing of the joint.

Figure 4:
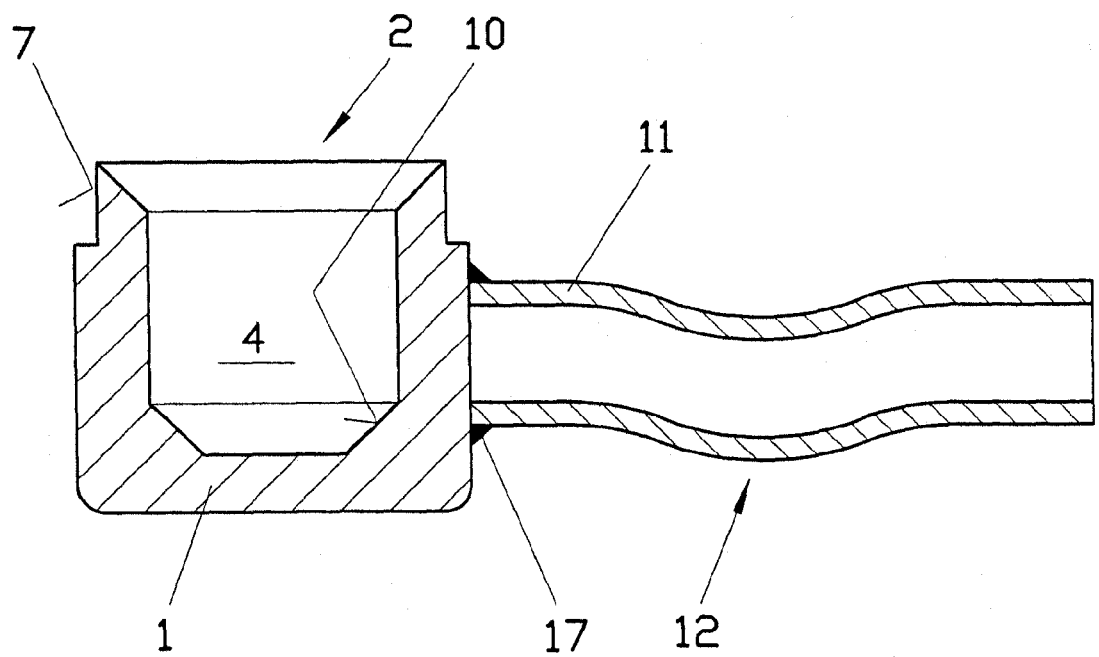
FIG. 4 is a cross sectional view showing another embodiment variant of a housing for a radial joint according to the present invention.

FIG. 4 shows, moreover, another, very simple embodiment of a housing 1 for a radial joint according to the present invention. This is not of a one-part design in this case, but comprises a plurality of individual parts, which can be fitted together in the sense of a modular system. Thus, this housing 1 has a separate shaft 11 with a bend 12. The connection between the housing 1 and the shaft 11 is brought about by means of a weld seam 17. Just as in the exemplary embodiments described before, housing 1 is equipped with section 7, which was manufactured by machining, and has an interior space 4 as well as an opening 2 suitable for inserting the ball pivot 3. Furthermore, this view shows flange 10 of housing 1, which flange is used to bring a corresponding support flange 9 into contact with the bearing shell 8, not shown here.

While specific embodiments of the invention have been shown and described in detail to illustrate the application of the principles of the invention, it will be understood that the invention may be embodied otherwise without departing from such principles.

What is claimed is:

1. A process for manufacturing a radial joint comprising a ball pivot with a joint ball and a one-piece metallic housing, said metallic housing having an opening on one side, said joint ball of said ball pivot being seated in an interior space of said metallic housing, wherein said joint ball of the ball pivot is mounted pivotably and rotatably in a bearing area of said interior space and a pivot section of said ball pivot, which pivot section is connected to said joint ball, protrudes from said housing through said opening of said housing, in an area of said opening of said housing, the process comprising the steps of:

manufacturing a housing blank including said opening on one side;

machining a section close to the opening of said housing after said housing blank is manufactured, wherein material is removed from an outer portion of said housing via said machining to form a sealing bellows seat after said housing blank is formed;

inserting said joint ball of said ball pivot into said interior space of said housing;

cold forming an opening-side edge section of said housing until a metallic overlap is achieved between said joint ball and said housing, said metallic overlap being sized for an extraction strength for the joint to be produced and to provide a positive-locking connection between said bearing shell and said housing; and providing a sealing bellows, wherein one end of said sealing bellows engages said sealing bellows seat.

2. A process in accordance with claim 1, wherein said housing is closed with the formation of said metallic overlap while periodically or permanently measuring one of the force and the torque necessary for deflecting and/or rotating the ball pivot.

3. A process in accordance with claim 1, wherein the joint ball is inserted, together with a bearing shell accommodating said joint ball, into the interior space of said housing and the deformation of said edge section of said opening of said housing also brings about a deformation of an opening-side section of the previously predominantly regular cylindrical bearing shell opening, said bearing shell being in contact with a surface of said joint ball during a closing of said housing.

4. A process for manufacturing a radial joint, the process comprising the steps of:
   providing a ball pivot with a joint ball and a pivot section connected to said joint ball;
   providing a bearing shell accommodating said joint ball;
   manufacturing a housing blank to provide a metallic housing with a cylindrical interior space with an opening on one side;
   machining a section close to the opening of said housing after said housing blank is manufactured, wherein material from said housing is removed in said section close to said opening of said housing via said machining such that an outer surface of said housing comprises a sealing bellows receiving area;
   inserting said joint ball with said bearing shell into said interior space of said housing to mount said ball pivot pivotably and rotatably in a bearing area of said interior space and said pivot section of said ball pivot protruding from said housing through said opening of said housing;
   cold forming an opening-side edge section of said housing until a metallic overlap is achieved between said joint ball and said housing, said metallic overlap being sized for an extraction strength for the joint to be produced and forming a positive-locking connection between said housing metallic overlap and said bearing shell accommodating said joint ball; and
   providing a sealing bellows comprising an end portion, at least a portion of said end portion being arranged in said sealing bellows receiving area.

5. A process in accordance with claim 4, wherein said housing is manufactured by a hot forming process, said housing comprising a hot formed surface.

6. A process in accordance with claim 5, wherein said hot forming process is a forging process.

7. A process in accordance with claim 4, wherein said housing is closed by cold forming said section in the area of said opening of said housing and is at first regular cylindrical prior to cold forming.

8. A process in accordance with claim 4, wherein said opening of said housing has a circular or oval geometry after it being closed.

9. A process in accordance with claim 4, wherein a diameter of said joint ball is larger, after the mounting of the joint, than said opening of said housing.

10. A process in accordance with claim 4, wherein said outer surface of said housing comprises a substantially radially extending portion and a substantially axially extending portion with respect to a longitudinal direction of said housing blank, wherein said substantially radially extending portion and said substantially axially extending portion define said sealing bellows receiving area of said housing.

11. A process in accordance with claim 10, wherein said bearing shell comprises at least one of a plastic, a plastic composite, a multicomponent material or at least partly of a plastic-metal composite, said bearing shell having a support flange, said housing having a flange in said interior space of said housing and corresponding to said support flange, said housing flange supporting said support flange.

12. A process in accordance with claim 10, wherein said end portion engages said substantially radially extending portion and said substantially axially extending portion.

13. A process in accordance with claim 4, wherein said housing comprises a shaft, said shaft having a bend.

14. A process in accordance with claim 13, wherein said housing with said shaft are manufactured together by a hot forming process.

15. A process in accordance with claim 4, wherein a shaft is welded to said housing.

16. A process in accordance with claim 4, wherein said cold forming process is a cold extrusion process.

17. A process for manufacturing a radial joint, the process comprising the steps of:
   providing a ball pivot comprising a joint ball and a pivot portion, said pivot portion being connected to said joint ball;
   providing a bearing shell;
   forming a one-piece metallic housing comprising a bearing area, said housing defining an interior space, said metallic housing having an opening on one side;
   machining an outer portion of said housing after forming said housing, wherein material is removed from said housing via said machining to form a sealing bellows seat;
   cold forming an opening-side edge section of said housing;
   inserting said joint ball with said bearing shell into said interior space of said housing; and
   providing a sealing bellows, wherein at least a portion of one end portion of said sealing bellows engages said sealing bellows seat.

18. A process in accordance with claim 17, wherein said housing is formed by a hot forming process, said opening having a first opening dimension after said hot forming process, said opening having a second opening dimension after said cold forming of said housing, said first opening dimension being greater than said second opening dimension, said cold forming process being a cold extrusion process.

* * * * *